United States Patent Office 3,317,918
Patented May 2, 1967

3,317,918
BUTADIENE POLYMERS PREPARED WITH A LITHIUM BASED CATALYST CHARACTERIZED BY HAVING AT LEAST 29 PERCENT OF THE BUTADIENE AS CIS-1,4
Frederick C. Foster, Canal Fulton, Ohio, assignor to The Firestone Tire & Rubber Company, Akron, Ohio, a corporation of Ohio
No Drawing. Filed Aug. 21, 1956, Ser. No. 605,440
3 Claims. (Cl. 260—83.7)

This application is a continuation-in-part of copending applications Ser. No. 544,351, filed Nov. 1, 1955, and Ser. No. 544,352, filed Nov. 1, 1955, now abandoned.

This invention relates to elastomeric synthetic polymers and, more particularly, to polymeric elastomers combining the desirable physical and chemical properties of both natural rubber and the presently employed synthetic rubbers.

It has been known for some time that natural rubber is a composition essentially composed of hypothetical "isoprene" units and minor but significant amounts of other substances derived from the rubber tree during the biochemical synthesis process. These substances include proteins, soaps, resins and sugars which cannot completely be removed without adverse effect on the natural polymer. As as result, even the most refined natural rubbers available are not pure hydrocarbons. Consequently, in the processing and curing of natural rubber, oxidation reactions take place forming carbonyl groups or other oxygen-containing structures. It has been clearly established that the material or materials in natural rubber other than the natural polymer have a definite effect upon the physical and chemical characteristics of the over-all composition.

Despite the proven structure of natural rubber, it is now accepted that the natural polymer is not formed by the polymerization of isoprene. Instead, β-methylcrotonic acid, biosynthesized from acetic acid via acetoacetic acid, is actually the precursor of the natural elastomer. The β-methylcrotonic acid (as a salt) is polymerized and is reduced by the action of acetoacetic enzymes and reducing enzymes (redases). The action of acetoacetic enzyme in the Hevea braziliensis and the guayule plant is specific and produces a substantially all-vis-polymer.

Recently developed methods for determining the structure of organic compounds and compositions have established that natural rubber possesses essentially a 1,4-structure, that is, the "isoprene" units of the rubber molecules are connected to each other through a 1,4-addition to produce a linear chain. Since each "isoprene" unit in the chain contains an unsymmetrical ethylene group, both the cis and trans isomers are possible. It has been determined that Hevea rubber molecules are essentially cis in structure, whereas Balata molecules are essentially trans in structure. As a consequence, Hevea rubber is very "rubbery," whereas Balata is quite resinous in its properties. Infra-red analysis of Hevea rubber has shown that the polymer consists of about 97.8% vis-1,4-structure and about 2.2% 3,4-structure. Balata consists of about 98.7% trans structure and about 1.3% 3,4-structure. Total unsaturation of Hevea rubber has been found to be about 95%. Polybutadienes heretofore known to the art have contained about 60–65% or more of trans 1,4-structure. The butadiene portion of a typical GR–S emulsion copolymer contains about 64% trans 1,4-structure, 18% cis-1,4-structure and 18% 1,2-structure.

Hevea natural rubber is characterized by excellent tack, especially after milling; thus being ideal for tire building operations. Hevea produces vulcanizates having excellent resilience and low hysteresis properties, high tensile strength, and good flexibility at low temperatures. Gum vulcanizates formed from Hevea also possess high tensile strength. Hevea natural rubber is characterized by a crystallinity of at least about 40% and displays a crystalline X-ray diffraction pattern when stretched.

Heretofore, the synthetic rubbers, in comparison with Hevea rubber, have exhibited low tack and no crystalline properties while their vulcanizates have been characterized by undesirably low tensile strengths and resilience, and undesirably high hysteresis. The synthetic rubbers, particularly the butadiene/styrene copolymer (GR–S), have been greatly superior to natural rubber in resisting crack initiation in service but have been markedly inferior to Hevea in resisting crack and cut growth. The undesirably high hysteresis of the synthetic rubbery polymers has prevented their use in any substantial quantity in the production of such articles as the large tires employed on trucks, buses, and large off-the-road vehicles.

Despite long and continued efforts on the part of the prior art, no synthetic rubber has heretofore been produced possessing the above enumerated characteristics of natural rubber which are essential in many industrial applications. Although the GR–S-type rubbers are extensively used in such applications as passenger car tires, their shortcomings even there have been generally recognized, particularly their relatively poor low temperature properties.

During the past twenty-five years considerable experimental work has been done in sodium catalyzed polymerizations. Both the Germans and Russians have produced sodium catalyzed polybutadiene rubbers which have enjoyed limited use but which have never been competitive with either natural rubber or the emulsion polymerized butadiene/styrene copolymers. Prior polybutadiene polymers and butadiene-styrene copolymers, inclusive of the sodium polymerized materials, have not generally been characterized by more than about 10 to 18% of cis-1,4-structure and have never even approached the physical properties of natural rubber.

A primary object of the present invention, therefore, is a synthetic polymer which will more closely approach the desired characteristics of natural Hevea rubber and, at the same time, possess the desirable attributes of the best synthetic rubbers presently available.

An additional object of the present invention is a synthetic polymer, which, when compounded into tire stock, possesses improved low temperature properties.

A further object of the present invention is a synthetic polymer which will combine low heat build up and high strength at elevated temperatures.

Another object of the present invention is a synthetic polymer which, when compounded into a rubber stock, will be characterized by improved hysteresis.

Specific embodiments of the invention are improved conjugated diolefine homopolymers and copolymers of conjugated diolefines and copolymerizable monomers which more closely approach natural rubber in physical properties.

In accordance with the present invention, novel polymers having extraordinary properties may be prepared by polymerizing butadiene-1,3 or butadiene-1,3 together with monovinyl aromatic compounds in the presence of selected catalytic materials and under closely controlled and critical reaction conditions.

Operable monovinyl aromatic compounds copolymerizable with butadiene-1,3 to form improved polymers in accordance with the invention include styrene, methyl styrene, o-, m- and p-methyl styrenes, the dimethyl styrenes, indene, vinyl napthylene, allyl benzene, allyl toluene, allyl naphthylene, stilbene, methyl stilbene, 1,3- diphenyl-1-butene, triphenylethylene, and the like. Styrene is the preferred copolymerizable monomer.

While copolymers of all proportions of butadiene-1,3 and monovinyl aromatic compounds are broadly embraced by the invention, it is preferred that the copolymers contain from about 5 to about 50% monovinyl aromatic compound and correspondingly from about 95 to about 50% butadiene-1,3.

The polymers of the invention contain a substantially increased amount of cis 1,4-structure and a substantially decreased amount of 1,2-structure. The butadiene monomer units are joined substantially entirely in head-to-tail relationship. These polymers are characterized by outstandingly good properties at extremely low temperatures and exhibit low temperature performance substantially superior to GR–S aqueous emulsion polymers (both those polymerized at about 122° F. and the so-called LTP polymerized at 41° F. or lower) and similar butadiene-styrene copolymers produced in metallic sodium-catalyzed polymerizations.

Compounding and curing of the synthetic polymers of the invention are effected according to usual practices employed with Hevea rubber. For example, cures of the polymers of the invention are brought about by conventional rubber curing techniques. Free sulfur as a curing agent is ordinarily employed in conjunction with an accelerator or combinations of accelerators. As in the case of Hevea rubber, it is generally desirable to employ free sulfur in an amount of from about 0.1 to about 10 percent based on the weight of the polymer where a soft rubber compound is to be produced. For hard rubber compounds from about 25 to about 50 percent free sulfur based on the polymer is used. Curing agents other than free sulfur suitable for curing Hevea rubber are also suitable for curing the synthetic polymers of the invention. Such other curing agents include selenium and tellurium (which may be used in conjunction with or replacing sulfur) dicumyl peroxide, the various phenol polysulfides including the alkyl derivatives thereof, the xanthogen polysulfides, the thiuram disulfides and polysulfides, various amine sulfides including dialkyl amine polysulfides and reaction products of primary amines with excess sulfur. Certain extremely finely divided colloidal sulfur preparations are sometimes advantageous. Other curing agents which may be utilized include the well known nitroso compounds, oximes, nitro compounds, azo compounds, and other materials which often act as oxidizing agents. Further, the polymers of the invention are vulcanized by treatment with X-rays, cosmic rays, electron beams, ultra high-frequency electromagnetic waves and ultrasonic vibration. These vulcanizing means can be combined with any of the curing agents mentioned above. The compound or stock can be heated in any known manner, including electronic heating, infra red heating, as well as the more conventional steam, hot water and oven heating methods. Ordinarily, vulcanization is effected by heating the compound at temperatures in the range of from 70° C. to 220° C. Since the temperature coefficient of vulcanization is in the range of 2.0 to 3.0 per 10° C., it is obvious that higher or lower vulcanization temperatures may be employed.

Along with the curing agent, as in the case of Hevea rubber, the usual accelerators, accelerator activators, retarders and the like are employed as desired. Such accelerators include the large classes of thiazole sulfenamides, thiazoline sulfenamides, thiocarbamyl sulfenamides, mercapto thiazoles, mercapto thiazolines, thiazolyl disulfides, the dithiocarbamates, the thiuram sulfides, guanidines, the xanthogen sulfides, metallic salts of mercapto thiazoles or mercapto thiazolines or dithiocarbamic acids, aldehyde amines, lead oxides and salts. Commercial accelerators of value in vulcanizing the polymers of the invention include 2-mercaptobenzothiazole, 2-mercaptothiazoline, 2,2' - dithiobisbenzothiazole, di-ortho-tolyl guanidine, tetramethyl thiuram disulfide, piperi-dinium pentamethylene dithiocarbamate, zinc dibutyl dithiocarbamate, hexamethylenetetramine, N-cyclohexyl-2-benzothiazole sulfenamide, N-t-butyl-2-benzothiazole sulfenamide, N - cyclodiethyleneoxy-2-benzothiazole sulfenamide and zinc butyl xanthate, among others. One or more accelerator activators may be employed with any of the accelerators mentioned where desired, and such activators include the various derivatives of guanidine known in the rubber art, amine salts of inorganic and organic acids, various amines themselves, metallic oxides, stearic acid, alkaline salts such as sodium acetate and the like, as well as other activators known to the art. Additionally two or more accelerators or accelerator combinations may be employed in a single compound.

Vulcanizates of the rubbery polymers of the invention are often improved for specific applications by containing finely divided fillers or reinforcing pigments dispersed therethrough. Slightly reinforcing or non-reinforcing pigments include calcium carbonates, clays, soft carbon blacks, lithopone, and the like. Reinforcing pigments include the hard carbon blacks, such as the HAF, ISAF, SAF and SFF furnace blacks, the acetylene blacks, the various channel blacks, high modulus furnace blacks, zinc oxide, very fine silicas and calcium silicates. The particle sizes of the powdery fillers are quite small, and the reinforcing pigments are extremely fine, being colloidal in nature. From about 0.5 to 200 parts of fillers or pigments are included in many rubber compounds or stocks, depending upon the use to which the vulcanizates are to be put, all as is well known in the art of natural rubber compounding.

One or more antioxidants are usually included in a rubbery polymer of the invention, both to protect it (stabilize it) before vulcanization and later to protect the vulcanizate. The same antioxidant is often employed both as a stabilizer and also an antiager for the vulcanizate. A wide variety of substances has been found to protect the novel polymers and vulcanizates from deterioration, coinciding to a large extent with the known antioxidants for natural rubber and including, without limitation, the various secondary amines, such as di-octyl-p-phenylenediamine, phenyl-beta - naphthylamine, acetone-diphenylamine reaction products, 2,2,4-trimethyl-6-phenyl - 1,2 - dihydroquinoline, the 2,2,4-trimethyl-6-alkyl-1,2-dihydroquinoline, the alkoxydiphenylamines, the p-alkyldiphenylamines, N,N'-diphenyl-p-phenylenediamine, phenyl-alpha-naphthylamine, polymerized 2, 2,4-trimethyl-1,2-dihydroquinoline; other amines such as m-tolylene diamine, p-aminodiphenylamine; phenolic compounds, such as 2,6-di-t-butyl-p-cresol, styrenated phenol or cresols, butyraldehyde condensate of mono-t-butyl-m-cresol, formaldehyde condensate of 2-t-butyl-4-methylphenol, 2,4-diamylphenol sulfide, dialkyl hydroquinones.

The preferred catalytic material is metllic lithium or a compound or a complex containing lithium.[1] These are illustrated by Sections I through IV hereafter and are herein referred to as lithium base catalysts.

Specific operable catalysts in the presence of which the novel butadiene polymers of the invention may be formed and methods for preparation of these catalysts are as follows:

(I) METALLIC LITHIUM

Metallic lithium catalyst is readily prepared by melting lithium metal (M.P. 186° C.) immersed in a medium such as petroleum jelly and subjecting the molten mass to high speed agitation under an inert atmosphere to produce finely divided metallic lithium particles dispersed in the jelly. The function of the petroleum jelly is to prevent air from contacting the lithium metal. Any other ---
[1] It has been established that all of the other alkali metals and their compounds are completely inoperable to produce polymers having the properties of the butadiene homopolymers and copolymers of the invention.

medium which will perform this function may be substituted for example, other inert hydrocarbon solvents boiling above 200° C., such as mineral oil, paraffin and the like may be employed. The preparation of the catalyst should be carried out in a closed container of nonreactive material, such as stainless steel or the like. Preferably, an amount of lithium will be employed sufficient to produce a dispersion containing from about 15 to about 50% metal, although other lithium concentrations may be employed as desired. A metal concentration of about 35% is preferred. Preferably, the particles of lithium will be characterized by a mean diameter of about 20 microns and a surface average of about 1 square meter per gram.

The activity of metallic lithium catalysts may be maintained at a high level by utilizing means which will continuously abrade the metal particles during the polymerization reaction. Such abrasion readily can be obtained by simply inserting inert metal rollers or balls, such as stainless steel balls, into the polymerization reaction and tumbling or turning the reactor in the conventional manner. It has also been found that the performance of metallic lithium as a catalyst in producing the improved polymers of the invention is enhanced by addition of small amounts of triphenylmethane to the polymerization recipe. Specifically, the addition of triphenylmethane is very effective in reducing the amount of gel content of the polymers obtained. Amounts of triphenylmethane varying between about 0.05 and about 2.0 parts by weight per 100 parts of monomer may be employed.

(II) HYDROCARBON LITHIUM COMPOUNDS

The hydrocarbon lithium compounds are generally operable to produce the improved polymers of the invention and are hydrocarbons having, for example, from 1 to 40 carbon atoms in which lithium has replaced hydrogen. Suitable lithium hydrocarbons include, for example, alkyl lithium compounds such as methyl lithium, ethyl lithium, butyl lithium, amyl lithium, hexyl lithium, 2-ethylhexyl lithium, n-dodecyl lithium and n-hexadecyl lithium. Unsaturated lithium hydrocarbons are also operable, such as allyl lithium, methallyl lithium and the like. Also operable are the aryl, alkaryl, and aralkyl compounds, such as phenyl lithium, the several tolyl and xylyl lithiums, alpha- and beta-naphthyl lithium and the like. Mixtures of such hydrocarbon lithium compounds may also be employed. For example, desirable catalysts may be prepared by reacting an initial hydrocarbon lithium compound successively with an alcohol and then with an olefin such as isopropylene (a technique analogous to the "Alfin" technique), whereby a greater or lesser proportion of the lithium from the initial hydrocarbon goes to form lithium alkoxide and to form a new organolithium compound with the olefin.

Surprisingly, the catalytic action of the hydrocarbon lithium catalysts employed to produce the polymers of the invention does not appear to be affected by the presence of salts of other alkali metals as impurities. For instance, in the synthesis of hydrocarbon alkali metal compounds, alkali metal halides are produced as by-products, while in catalysts produced by the "Alfin" technique, alkali metal alkoxides are formed. Where in other polymerization reactons alkali metals other than lithium are employed, either in the form of the metal alone or in alkali metal hydrocarbons, these extraneous compounds exert a different effect upon the structure produced.

(a) Polylithium hydrocarbons

It has been discovered that faster polymerization reactions and polymers of higher molecular weight can be obtained by utilizing as a catalyst a polylithium hydrocarbon either alone or in admixture with other of the operable catalysts. Polylithium hydrocarbon catalysts differ from the generally operable lithium hydrocarbons in that lithium has replaced a plurality of hydrogen atoms instead of a single hydrogen atom. Suitable polylithium compounds include, without limitation, alkylene dilithium compounds, such as methylene dilithium, ethylene dilithium, dimethylene dilithium, trimethylene dilithium, pentamethylene dilithium, hexamethylene dilithium, decamethylene dilithium, octadecamethylene dilithium, 1,2-dilithium propane, and the like. Polylithium alkyl, alkaryl, and aralkyl compounds, such as 1,4-dilithium benzene, 1,4-dilithium naphthalene, 1,2-dilithium 1,2,3-triphenyl propane, and the like may be employed. Tri- and higher lithium hydrocarbons are also operable, such as 1,3,5-trilithium pentane or 1,3,5-trilithium benzene.

(b) Lithium dihydrocarbon amides

Excellent polymers are also obtained by employing lithium dihydrocarbon amides as catalysts having the formula:

wherein R is a hydrocarbon radical containing from 1 to 40 carbon atoms such as cyclo and cycloalkyl groups, for example, methyl, ethyl, propyl, isopropyl, butyl, isobutyl, tertiary butyl, the various pentyl groups, n-hexyl, cyclohexyl, 2-ethyl hexyl, decyl, dodecyl, and undecyl groups. The mixed alkyl radicals derived by the reduction of the fatty acid radicals of natural fats such as coconut oil, tallow and the like, hexadecyl, octadecyl, eicosyl, heneicosyl groups, and the like; and aryl, aralkyl and alkaryl groups such as phenyl, benzyl, phenyl ethyl, tolyl, xylyl, alpha- and beta-naphthyl, xenyl groups, and the like.

The lithium dihydrocarbon amide and catalyst may be prepared by known reactions. A convenient method for preparing these compounds involves the reaction of a hydrocarbon lithium such as n-amyl lithium with an appropriate secondary amine in accordance with the equation:

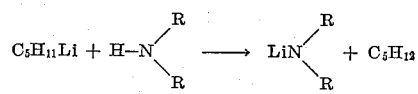

the radicals R being defined as above. The reaction is easily carried out at room or slightly elevated temperatures in closed containers of non-reactive materials such as glass, stainless steel, and the like.

(III) CRYSTALLINE SALTS IN ADMIXTURE WITH COLLOIDALLY DISPERSED LITHIUM METAL

Polymers containing a very high cis-1,4-content are obtained by employing as a catalyst a composite body comprising metallic lithium colloidally dispersed and associated with a matrix of a solid crystalline salt, the metal preferably being present in such an extremely fine dispersion that it imparts a characteristic blue coloration to the matrix, indicating that reduced lithium atoms are dispersed in the crystal lattice of the salt. Preferably, the salt is an alkali metal salt and desirably a lithium halide, such as lithium chloride. The dispersion of the lithium metal in association with the salt matrix may be effected in various ways. For example, a lithium halide or other salt may be exposed to an electron beam or other radiation sufficiently energetic to reduce a portion of the lithium ions in the salt's crystal lattice. Somewhat the same effect may be obtained by exposing a lithium salt such as lithium aluminum hexachloride or lithium aluminum tetraethyl to the action of a more electropositive material, for instance another alkali metal or a covalent derivative of another alkali metal such as an alkali metal hydrocarbon derivative. Likewise, the catalyst may be obtained by a process converse to the above in which metallic lithium is oxidized under somewhat hindered conditions to form the salt matrix. For instance, in the reaction of metallic lithium with alkyl, aryl or other hydrocarbon halides formed from hydrocarbon lithium, the lithium halide crystals formed contained metallic lithium dispersed in the lattices thereof as indicated by their blue coloration. Catalysts prepared in this manner should be isolated from the organolithium compound so produced in order to obtain full benefits of the catalyst since, although the organolithium compound is itself an operable catalyst, best results are obtained where the crystalline salt-lithium complex is employed in its pure form. The organolithium compound is removed by repeated washing with a suitable organic solvent. The salt-lithium complexes may also be obtained by electrolysis of fused lithium chloride or by dissolving lithium metal and a lithium salt, such as lithium chloride, in liquid ammonia and subsequently evaporating the ammonia.

(IV) COMPOSITE COMPRISING (a) LITHIUM METAL OR LITHIUM HYDROCARBON IN ASSOCIATION WITH (b) A FLUORINE-CONTAINING SALT

Component (a) of this composite catalyst is prepared in accordance with the processes above disclosed. The salt of component (b) is any salt, the anions of which consist of or include fluorine, such as sodium fluoborate, potassium fluoborate, lithium fluoborate, sodium fluoboride, potassium fluoride, calcium fluoride, magnesium fluoride, sodium fluotitanate, sodium fluosilicate, sodium fluoaluminate, barium fluoride salts, cryolite, cryolithionite and the like.

The composite catalyst is prepared by intimately admixing together the lithium or lithium-containing catalyst and the fluorine-containing salt. Preferably, this mixture is thoroughly agitated together for an extended period before contacting with the monomeric material. Since the advantageous catalytic effect appears to result from an interaction between the two components, most conveniently the mixing is done in the presence of an inert solvent such as those previously disclosed as being operable as a polymerization medium in the polymerization reaction. Some reaction, of obscure nature, appears to take place between the lithium or lithium-containing compound and the fluorine-containing salt, since suspensions of the composite catalysts have a swirling, nacreous appearance and, where lithium metal is employed as one component of the catalyst, the lithium can no longer be seen floating on the surface of the suspension medium. In order to effect a thorough association of the lithium-dependent component and fluorine-containing salt, it is preferred to agitate or grind the components together for a substantial time, say for one hour or more. Conveniently, the agitation may be carried out with the materials suspended or slurried in a suitable inert organic solvent. The ratio of lithium-containing catalyst to fluorine-containing salt is not critical and may be varied, for instance, between 1–20 and 20–1 on a molar basis. The reaction between the components may take place at any desired temperature below the decomposition temperature of the salt but will preferably be conducted at room temperature.

It is essential that air be excluded during the preparation of all of the catalyst materials described. Thus, whether the catalyst be lithium metal or lithium-containing compounds it is necessary that the catalyst be prepared in closed containers provided with means for exclusion of air. Preferably, the catalyst will be employed shortly after preparation, although the catalyst may be stored for reasonable periods of time if substantial contact with the atmosphere is prevented during removal from the vessel in which the catalyst is prepared, during storage and during subsequent introduction into the reaction chamber. As will be illustrated, the catalyst often may be produced in situ in the reaction vessel.

In general, the larger amount of catalyst used, the more rapidly the polymerization will proceed at a given temperature and the lower the molecular weight of the resulting product. Desirably, sufficient catalyst should be employed to provide from 0.001 to about 0.5 gram of active metal for each 100 grams of monomer in the polymerization mixture.

All of the above catalysts, with or without supports or carriers, have been found, under proper conditions, to direct the polymerization of butadiene in its homopolymers and copolymers with monovinyl aromatic compounds to a structure containing increased cis-1,4-structure and decreased 1,2-structure. In the polymers of the invention the butadiene is present in at least about 29% cis-1,4-structure and not more than about 15% 1,2 addition product.

Once a pure catalyst has been prepared, the most important factors influencing the structure and properties of the polymer obtained, the speed of reaction, and the yield are:
(1) Purity of monomer.
(2) Concentration of moisture, oxygen and air.
(3) Temperature of the reaction.

*Purity of monomer*

High cis-1,4-structure and lower 1,2-structure are obtained with highly pure monomeric material.

It is desirable that the monomer be handled at all times in contact only with its own vapor or with atmospheres containing only its own vapor and an inert gas, such as helium or argon. Particularly to be avoided is the presence of oxygenated organic compounds such as ethers, esters and the like, which, in prior polymerization procedures, have often been considered as indispensable constituents of alkali-metal-base catalyst systems. In order to obtain the preferred polymer of this invention, these materials must be rigorously excluded from the reaction mixtures. Moreover, nitrogen and nitrogenous compounds such as amines and the like must also be excluded where a lithium-containing catalyst is employed. Nitrogen atmospheres are desirable only with catalyst systems which do not contain lithium.

*Concentration of moisture, oxygen and air*

Since moisture tends to use up catalyst, it should be excluded from the reaction zone insofar as is possible. Oxygen, nitrogen and other components of the air seriously inhibit the desired polymerization reaction and consequently should be excluded from the reaction zone. In laboratory or small scale equipment, all of these substances conveniently may be removed by bringing the polymerization charge to a boil and venting a small proportion of the charge (e.g., about 10%) prior to sealing the reactor and effecting polymerization. In large scale production, however, charging of the reactor is preferably conducted under an inert atmosphere.

*Temperature*

It has been found that the molecular weight and proportion of cis-1,4-structure of the polymers in accordance with the invention generally increase as the temperature of polymerization is decreased. Additionally, the reaction is quite difficult to control at elevated temperatures, particularly where monomer of the preferred highest purity is employed. It has also been found that gel content increases as higher polymerization temperatures are employed, especially with lithium containing catalysts. Consequently, it is desirable to operate at the lowest temperature at which a practical yield of the desired product may be obtained. Since polymerization reactions of the type contemplated ordinarily require a considerable induction period, it is often desirable to initiate the polymerization reaction at a higher temperature and then lower the temperature to the desired level by suitable cooling means once the polymerization reaction has been initiated. In this manner, the induction period will be lessened and the benefits of low temperature polymerization, as above indicated, may be obtained. In general, the polymers of the invention are produced at temperatures between −100° C. and 150° C. A polymerization temperature of from 0 to 80° C. is preferred.

In accordance with the invention, the monomers may be polymerized in either liquid or vapor phase, but desirably the polymerization reaction will be carried out in the presence of a suitable inert organic solvent. Solvents operable in the process whereby the polymers of this invention are produced must be non-polar, non-acidic, organic substances. Suitable solvents include the saturated aliphatic hydrocarbon solvents, such as the straight and branched chain paraffins and cycloparaffins containing from 3 to 16 carbon atoms which include, without limitation, propane, pentane, hexane, petroleum ether, heptane, dodecane, cyclopentane, cyclohexane, methyl cyclohexane, and the like. Aromatic solvents such as benzene, toluene, xylene, and the like are also operable. The same considerations as to purity and absence of interfering compounds applying to the monomers also apply to the solvent. A treatment which has been found particularly advantageous for the purification of paraffin solvents, such as petroleum ether, consists of agitating the solvent with concentrated sulfuric acid and thereafter repeatedly washing with water. The solvent may then be suitably dehydrated by passage through silica gel, alumina, calcium chloride or other dehydrating or absorbing media, and thereafter distilled. As in the case of the monomer, the solvent after being purified desirably should be handled in contact only with its own vapor or with atmospheres containing only its vapor and inert gases such as helium and argon.

The polymerization reaction

Laboratory scale polymerization reactions producing the polymers of the invention may conveniently be conducted in glass beverage bottles sealed with aluminum lined crown caps. The polymerization bottles should be carefully cleaned and dried before use. The catalyst employed may be added to the bottle by weight or, where possible, the catalyst can be melted and added by volume. In some instances, it is desirable to add the catalyst as a suspension in the monomer. The monomer is added by volume, desirably employing sufficient excess so that about 10% of the charge can be vented to remove moisture, oxygen and air from the bottle. The removal of oxygen from the free air space above the monomer in the polymerization bottle as well as dissolved oxygen in the monomer is an important step in the bottle loading procedure. The cap is placed loosely on the bottle and the monomer is brought to a vigorous boil as by placing the bottle on a heated sand bath. When approximately 10% of the charge has been vented the bottle is rapidly sealed. Such procedure substantially excludes the air and oxygen which drastically inhibit polymerization.

The sealed bottles may be placed on a polymerization wheel immersed in a liquid maintained at a constant temperature, and rotated. Alternatively, the charge bottle may be allowed to stand stationary in a constant temperature bath or otherwise heated or cooled until the polymerization reaction is complete. Ordinarily, the static system requires a considerably longer reaction time but, due to the relative slowness of the reaction, may in some instances be attractive where higher molecular weights are desired. After the induction period, the charge goes through a period of thickening and finally becomes solid. At the end of the polymerization reaction, when properly conducted, all of the monomer has been consumed and there is a partial vacuum in the free space of the reaction vessel.

After polymerization has been completed, and the bottle cooled to handling temperature, the polymer may be removed by cutting the bottle open. Preferably the crude polymer will be washed immediately on a wash mill to remove the catalyst. An antioxidant, for example, 3% phenyl-beta naphthylamine, is desirably added as soon as the catalyst has been destroyed and water washing is then resumed. Cold water will preferably be employed to minimize oxidation of the polymers. In order to recover the polymer with a minimum degree of oxidation, it is preferred that the polymer, after being removed from the reaction vessel, be immediately immersed in an alcohol, such as methanol, containing about 3% antioxidant. The methanol destroys the catalyst and carries the antioxidant into the polymer mass.

Corresponding techniques may be employed in large scale polymerization processes. Usually the reaction will be carried out in a closed autoclave provided with a heat transfer jacket and a rotary agitator. Avoidance of oxygen contamination is most easily secured by evacuating the vessel prior to charging the monomer (and solvent, if used) and employing an inert atmosphere. To insure the purity of the monomer and solvent, a silica gel or other suitable absorption column is preferably inserted in the charging line employed for introduction of these materials to the reactor. The catalyst is preferably charged last, conveniently from an auxiliary charging vessel pressured with an inert gas and communicating with the polymerization vessel through a valved conduit. It is desirable to provide a reflux condenser to assist in the regulation of the reaction temperature. Upon completion of polymerization, the product is removed and immersed under the surface of the body of methanol, isopropanol, or other alcohol containing an antioxidant, and agitated therewith to precipitate the polymer, destroy the catalyst and incorporate the antioxidant. The precipitated mass may be milled with water on a wash belt to remove the alcohol and additional antioxidant may be incorporated during this operation. The product is then dried for storage and use.

Microstructure of products of the invention

The amounts of cis-1,4-, trans-1,4-, 1,2-additions and styrene in the polymers of the invention are best determined by an infra-red analysis. The relative amounts of the four structures named are found by measuring the intensities of the infra-red absorption bands at 14.70, 10.34, 10.98 and 14.29 microns for the four types of structures, in the order given above and inserting these values into the equations:

(1) $$D^i = e_1^i C_1 + e_2^i C_2 + e_3^i C_3 + e_4^i C_4$$

where $D^i$ = absorbance (optical density) of the polymer at wavelength $i$ $e^i_{1, 2, 3 \text{ or } 4}$ = The absorptivities of the several structures in wavelength $i$, the subscripts 1, 2, 3 or 4 referring to the several component structures, and $C_{1, 2, 3 \text{ or } 4}$ = The concentrations of the several structures, the subscripts 1, 2, 3 or 4 referring to the several component structures.

The four equations obtained in this way were solved for $C_1$, $C_2$, $C_3$ and $C_4$, the values of the concentrations of the cis-1,4-, trans-1,4-, 1,2-addition and styrene components in the polymer.

The peak wavelengths selected, and the values of the absorptivities $e^i$ for these wavelengths for the several structures, are tabulated herewith:

| Structures | Molar Absorptivities $e^i$ at Wavelength of | | | |
|---|---|---|---|---|
| | 14.70 microns | 10.34 microns | 10.98 microns | 14.29 microns |
| 1,2-addition | 1.2 | 7.4 | 145.0 | 1.4 |
| Cis-1,4-addition | 23.0 | 9.5 | 4.4 | 25.0 |
| Trans-1,4-addition | 2.4 | 109.0 | 3.0 | 2.3 |
| Styrene | 1.1 | 3.4 | 7.2 | 154.0 |

Percentage values for the various types of addition products and styrene, based on the total polymer, are derived by dividing the absolute concentration of each type of component by the sum of the concentrations of the four types of components (1,2-; cis-; trans- and styrene) determined and multiplying by 100%. In order to assess the accuracy of the determination, total unsaturation is found; this is the quotient of the sum of the concentrations of the various components found by infra-red analysis, divided by the concentration of the solution used in the analysis, which is found by determining the total solids. Where only butadiene homopolymers are involved, the portions of the equations dealing with the styrene component are ignored. In the detailed examples given hereafter, percent styrene is reported as derived above (based on total polymer). In the following examples, percentage of the other components (which actually are components of the diolefin portion of the polymer) of the polymer, however, are reported in each instance as per cent of the butadiene portion of the polymer. The butadiene portion of the polymer constitutes the value obtained by subtracting the percent styrene (based on total polymer) from 100. The percent of each of the other components (based on only the butadiene portion of the polymer) is consequently obtained in each instance by dividing the percent of the component (based on the total polymer) by the number obtained by subtracting the percent styrene (based on the total polymer) from 100 and multiplying the quotient thus obtained by 100.

Having generally described the invention, the following examples are presented to illustrate the preparation of various operable catalysts and the polymerization of the contemplated monomeric material in the presence of these catalytic materials.

Example 1

The following recipe was charged into a reaction chamber.

| | Parts by weight |
|---|---|
| Butadiene | 100.0 |
| Petroleum ether | 68.0 |
| Lithium metal (as 35% dispersion in petrolatum) | 0.3 |

Polymerization of the above ingredients was effected at 50° C. using the previously outlined technique. The resulting polymer had a gel content of 15% and an inherent viscosity of 9.1. By infra-red analysis the polymer contained 32% cis-1,4-; 57.3% trans-1,4-; and 10.6% 1,2-addition products.

Example 2

The following recipe was polymerized at 50° C.

| | Parts by weight |
|---|---|
| Butadiene | 100.0 |
| Petroleum ether | 68.0 |
| Lithium metal (as 35% dispersion in petrolatum) | 0.3 |

The resulting polymer had a gel content of 2% and an inherent viscosity of 7.8. The polymer contained by infra-red analysis 28.1% cis-1,4-; 60.9% trans-1,4-; and 11.0% 1,2-addition products.

Example 3

The following recipe was polymerized at 40° C.

| | Parts by weight |
|---|---|
| Butadiene | 100.0 |
| Petroleum ether | 68.0 |
| Lithium metal (as 35% dispersion in petrolatum) | 0.3 |

The resulting polymer had a gel content of 1% and an inherent viscosity of 6.3. The polymer contained by infra-red analysis 29.0% cis-1,4-; 60.5% trans-1,4-; and 10.4% 1,2-addition products.

Example 4

The following recipe was polymerized at 40° C.

| | Parts by weight |
|---|---|
| Butadiene | 100.0 |
| Petroleum ether | 68.0 |
| Lithium metal (as 35% dispersion in petrolatum) | 0.5 |

The resulting polymer had a gel content of 2.8% and an inherent viscosity of 6.1. The polymer contained by infra-red analysis 28.9% cis-1,4-; 60.3% trans-1,4-; and 10.8% 1,2-addition products.

Example 5

The following recipe was polymerized at 70° C.

| | Parts by weight |
|---|---|
| Butadiene | 100.0 |
| Petroleum ether | 68.0 |
| Lithium metal (as 35% dispersion in petrolatum) | 0.3 |

The resulting polymer had a gel content of 14% and an inherent viscosity of 7.2. The polymer contained by infra-red analysis 30% cis-1,4-; 58% trans-1,4-; and 11.9% 1,2-addition products.

Example 6

The following recipe was polymerized at 50° C.

| | Parts by weight |
|---|---|
| Butadiene | 100.0 |
| Lithium metal (as 35% dispersion in petrolatum) | 0.3 |

The resulting polymer had a gel content of 4% and an inherent viscosity of 5. The polymer contained by infra-red analysis 29% cis-1,4-; 58.2% trans-1,4-; and 12.8% 1,2-addition products.

Example 7

The same recipe used in Example 6 was polymerized at 60° C. The resulting polpmer had a gel content of 11% and an inherent viscosity of 5.6. The polymer contained by infra-red analysis 30% cis-1,4-; 57% trans-1,4- and 13% 1,2-addition product.

Example 8

The following recipe was polymerized at 60° C.

| | Parts by weight |
|---|---|
| Butadiene | 100.0 |
| Lithium metal (as 35% dispersion in petrolatum) | 0.1 |

The resulting polymer had a gel content of 1% and an inherent viscosity of 5. The polymer contained by infra-red analysis 29.1% cis-1,4-; 57.2% trans-1,4-; and 13.6% 1,2-addition product.

Example 9

The following recipe was polymerized at 30° C.

Butadiene _____ 100.0
Lithium (as 35% dispersion in petrolatum) _____ 0.3

The resulting polymer contained no gel and had an inherent viscosity of 6.4. The polymer by infra-red analysis contained 31.5% cis-1,4-; 58.2% trans-1,4- and 10.3% 1,2-addition product.

*Example 10*

The following recipe was polymerized at 70° C.

Parts by weight
Butadiene _____ 100.0
Cyclohexane _____ 156.0
Lithium (as 35% dispersion in petrolatum) _____ 1.0

The resulting polymer contained 3.3% gel and had an inherent viscosity of 4.48. The polymer contained by infra-red analysis 34.7% cis-1,4-; 52.2% trans-1,4-; and 13.1% 1,2-addition products.

The above polymer was compounded and cured in a typical stock as follows:

Parts by weight
Polymer _____ 100.0
Zinc oxide _____ 4.0
Stearic acid _____ 1.5
Softener _____ 8.0
Sulfur _____ 3.0
Carbon black _____ 20.0
Accelerator _____ 1.4
Accelerator activator _____ 1.0
Antioxidant _____ 1.2

Typical polybutadiene produced by emulsion and sodium catalyzed polymerization were similarly compounded and cured. The physical properties of these three compounds were obtained at optimum cures and are set out in the following table.

TABLE

| | Polymer of invention | Emulsion polybutadiene | Sodium polybutadiene |
|---|---|---|---|
| Dynamic modulus by Forced vibrator, p.s.i.:[1] | | | |
| At 100° C | 198 | 60 | 70 |
| At 50° C | 204 | 78 | 84 |
| Young's Bending Modulus:[2] | | | |
| Temp. ° C., for 10⁴ p.s.i | −81 | −70 | −50 |
| Temp. in ° C. at which 50% recovery takes place in 1 minute[3] | −65 | −45 | −40 |

[1] Measured according to test of J. H. Dillon, I. B. Prettyman and G. L. Hall, *Journal of Applied Physics*, vol. 15, pp. 309-323 (1944).
[2] Measured in accordance with Liska and Grover, U.S. Patent 2,404,584.
[3] Measured according to test of F. S. Conant, G. L. Hall and W. James Lyons, *Journal of Applied Physics*, vol. 21, pp. 499-504 (1950).

Referring to the above data, it is seen that the stress-strain properties of rubber compounds containing the polymer of the invention compare favorably with such properties for compounds containing emulsion and sodium polybutadienes. The cold properties of the polymers of the invention, however, are superior as shown by the Young's Bending Modulus values and by the temperature at which 50% recovery occurs in 1 minute. The independence of the properties of polymers of the invention is quite unusual as shown by the very slight change in the dynamic moldulus of polymers of the invention over a wide temperature range. The unusual properties of the polymers of the invention ideally adapt these polymers for low temperature application such as rubber mountings, gaskets, rubber cushioning and the like.

*Example 11*

The following recipe was polymerized at 70° C.

Parts by weight
Butadiene _____ 51
Styrene _____ 49
Cyclohexane _____ 50
Lithium metal (as 35% dispersion in petrolatum) __ 1

By infra-red analysis the resulting polymer contained 39.3% styrene (based on total polymer) and 29.6 cis-1,4-; 57.6% trans-1,4-; and 12.8% 1,2-addition products (based on the diene portion of the polymer).

*Example 12*

The following recipe was polymerized at 70° C.

Parts by weight
Butadiene _____ 90
Styrene _____ 10
Cyclohexane _____ 200
Lithium (as 35% dispersion in petrolatum) _____ 1

The resulting polymer had a gel content of 3.6% and an inherent viscosity of 3.14. By infra-red analysis the polymer contained 14.8% styrene (based on total polymer) and 29.8% cis-1,4-; 58.3% trans-1,4-; and 11.9% 1,2-addition products (based on the diene portion of the polymer).

*Example 13*

The following recipe was polymerized at 50° C.

Parts by weight
Butadiene _____ 71.7
Styrene _____ 28.3
Cyclohexane _____ 200.0
Lithium metal (as 35% dipersion in petrolatum) __ 1.0

By infra-red analysis the resulting polymer contained 39.1% styrene (based on total polymer) and 27.9% cis-1,4-; 60% trans-1,4-; and 12.3% 1,2-addition products (based on the diene portion of the polymer).

*Example 14*

The following recipe was polymerized at 70° C.

Parts by weight
Butadiene _____ 78
Styrene _____ 22
Cyclohexane _____ 300
Lithium (as 35% dispersion in petrolatum) _____ 1

By infra-red analysis the resulting polymer contained 18% styrene (based on total polymer) and 29.4% cis-1,4-; 57.7% trans-1,4-; and 12.9% 1,2-addition products (based on the diene portion of the polymer.)

*Example 15*

The following recipe was polymerized at 70° C.

Butadiene _____ 90
Styrene _____ 10
Cyclohexane _____ 300
Lithium metal (as 35% dispersion in petrolatum) __ 1

By infrared analysis, the resulting polymer contained 8% styrene (based on total polymer) and 37.5% cis-1,4-; 50.5% trans-1,4-; and 12% 1,2-addition products (based on the diene portion of the polymer).

*Example 16*

The following recipe was polymerized at 70° C.

Parts by weight
Butadiene _____ 60
Styrene _____ 40
Cyclohexane _____ 250
Lithium metal (as 35% dispersion in petrolatum) __ 1

The resulting polymer had a Mooney value $ML_4$ of 130. By infra-red analysis the polymer contained 36.3% styrene (based on total polymer) and 27.6% cis-1,4-; 60.5% trans-1,4-; and 11.9% 1,2-addition products (based on the diene portion of the polymer).

The polymer of Example 16 was compounded and cured in the following formula:

Parts by weight
Polymer _____ 100.0
Carbon black _____ 20.0

| | Parts by weight |
|---|---|
| Zinc oxide | 4.0 |
| Stearic acid | 1.5 |
| Softener | 8.0 |
| Sulfur | 3.0 |
| Accelerator | 0.7 |
| Accelerator activator | 0.9 |
| Antioxidant | 1.2 |

Typical butadiene-styrene copolymers produced by emulsion polmerization (a 76.5–23.5 butadiene-styrene GR–S low temperature polymer) and sodium polymerization (a 75–25 butadienestyrene copolymer) were similarly compounded and cured. The physical properties of these three compounds were obtained at optimum cures and are set out in the following table. :

TABLE

| | Polymer of invention | GR–S LTP | Sodium polymer |
|---|---|---|---|
| 300% Modulus, p.s.i. | 1,000 | 550 | 525 |
| Tensile at break, p.s.i. | 1,150 | 1,900 | 1,150 |
| Elongation at break, percent | 420 | 520 | 460 |
| Young's Bending Modulus: * Temp. ° C., for $10^4$ p.s.i. | −65 | −40 | −25 |

*Measured in accordance with Liska and Grover, U.S. Patent 2,404,584.

Referring to the above data, it is seen that the stress-strain properties of the polymer in accordance with the invention are comparable with similar properties of an LTP, GR–S or a sodium polymer. The cold properties of the polymer of the invention, however, are outstanding as shown by the results of Young's Bending Modulus tests. This excellence is augmented by the fact that the styrene content of the polymer of the invention was appreciably greater than the styrene contents of both the emulsion GR–S and the sodium polymer.

The polymer of Example 14 above was compounded and tested in a typical fuel cell sealant recipe. The resulting sealant compound performed well at −67° F. The polymers of the invention, because of their unusual properties, are ideally adapted for many other applications involving arctic conditions such as tires and inner tubes, hoses, gaskets, rubber cushionings and mounting and the like.

From the foregoing examples it is apparent that the novel polymers and copolymers of the invention are characterized by physical and chemical properties different from those of known polymers of this general type. The polymers, due to their higher cis 1,4-structure and lower 1,2-structure, more closely approach natural rubbers in properties, especially low temperature flexibility, while maintaining the crack initiation resistance of the GR–S type synthetic elastomer. The low gel constant of the polymers of the invention is advantageous in reducing the amount of milling necessary prior to compounding.

Since modifications of the invention will be apparent to those skilled in the art, it is intended that the invention be limited solely by the scope of the appended claims.

What is claimed is:

1. A synthetic polymer selected from the group consisting of rubbery homopolymers of butadiene-1,3 and rubbery copolymers of butadiene-1,3 and styrene; said synthetic polymer being characterized by a cis-1,4 structure of at least about 29 percent and a 1,2 structure not in excess of fifteen percent of the polymeric butadiene present in the polymer as determined by the infra-red technique hereinabove defined, said polymer being formed through utilization of a lithium base catalyst.

2. A synthetic polymer in accordance with claim 1, said polymer being a rubbery homopolymer of butadiene-1,3.

3. A synthetic polymer in accordance with claim 1, said polymer being a rubbery copolymer of butadiene-1,3 and styrene.

References Cited by the Examiner

UNITED STATES PATENTS

| | | | |
|---|---|---|---|
| 1,073,116 | 9/1913 | Harries | 260—94.2 |
| 2,692,255 | 10/1954 | Kreider | 260—83.7 |
| 3,178,402 | 4/1965 | Smith et al. | 260—94.3 |

OTHER REFERENCES

Binder: "Ind. & Eng. Chem.," 46, 1727–30 (1954).

J. L. Binder: Technical Report to RFC, ORR No. CR–2803, 20 pages, pages 1–14 relied on, Sept. 7, 1951.

F. E. Condon: Jour. Poly. Sci., vol. XI, No. 2, pages 139–149, August 1953.

Gaylord et al.: Jour. Poly Sci., vol. XLII (1960) pages 417–440, pages 417–425 relied on.

Meyer: Industrial and Engineering Chemistry, vol. 41, pages 1570–7 (1949).

Talalay: Synthetic Rubber From Alcohol Interscience, New York (1945).

Wood: "Journal of Applied Physics," 25 851–54 (1954).

Ziegler: "Rubber Chem. & Tech.," 501–07 (1938).

JOSEPH L. SCHOFER, *Primary Examiner.*

M. LIEBMAN, D. ARNOLD, W. HOOVER, E. J. SMITH, E. L. ROBERTS, L. H. GASTON, A. M. BOETTCHER, M. E. JACOBS, R. G. WEILACHER, R. WEXLER, *Assistant Examiners.*

UNITED STATES PATENT OFFICE
CERTIFICATE OF CORRECTION

Patent No. 3,317,918  
May 2, 1967

Frederick C. Foster

It is hereby certified that error appears in the above numbered patent requiring correction and that the said Letters Patent should read as corrected below.

Column 1, line 26, for "As as" read -- As a --; lines 45 and 59, for "vis" each occurrence, read -- cis --; column 2, line 55, for "embodiments" read -- objects --; line 71, for "napthylene" read -- naphthalene --; line 72, for "naphthylene" read -- naphthalene --; column 4, line 55, for "metllic" read -- metallic --; column 6, line 41, strike out "and"; column 8, line 8, after "larger" insert -- the --; line 34, for "High" read -- Higher --; column 13, lines 56 to 60, strike out "it is seen that the stress-strain properties of rubber compounds containing the polymer of the invention compared favorably with such properties for compounds containing emulsion and sodium polybutadienes."; line 60, for "The" read -- the --; line 61, strike out ", however,"; column 14, line 47, insert -- Parts by Weight --, as a heading to the right-hand column of the tabulation; column 16, line 2, for "constant" read -- content --.

Signed and sealed this 7th day of November 1967.

(SEAL)  
Attest

EDWARD M. FLETCHER, JR.  
Attesting Officer

EDWARD J. BRENNER  
Commissioner of Patents